United States Patent [19]

Kirino et al.

[11] Patent Number: 5,315,577
[45] Date of Patent: May 24, 1994

[54] OPTICAL RECORDING/REPRODUCING BY CHANGING PERPENDICULAR MAGNETIC ANISOTROPY TO NON-PERPENDICULAR MAGNETIC ANISOTROPY

[75] Inventors: Fumiyoshi Kirino, Suginami; Junko Nakamura, Kokubunji; Ryo Suzuki, Hachiouji; Masafumi Yoshihiro, Yuuki; Yukinori Yamada, Tsukuba; Norio Ohta, Kitasouma, all of Japan

[73] Assignees: Hitachi, Ltd., Tokyo; Hitachi Maxell, Ltd., Osaka, both of Japan

[21] Appl. No.: 846,883

[22] Filed: Mar. 6, 1992

[30] Foreign Application Priority Data

Mar. 7, 1991 [JP] Japan ................................. 3-41807

[51] Int. Cl.⁵ .............................................. G11B 7/125
[52] U.S. Cl. ...................................... 369/116; 369/13; 369/288
[58] Field of Search ............... 369/116, 13, 272–274, 369/288; 428/694

[56] References Cited

U.S. PATENT DOCUMENTS

| | | |
|---|---|---|
| 4,176,277 | 11/1979 | Bricot et al. .................... 250/316.1 |
| 4,405,862 | 9/1983 | Bricot et al. ....................... 250/318 |
| 4,617,601 | 10/1986 | Tanaka .................................. 360/131 |
| 4,862,437 | 8/1989 | Okada ..................................... 369/13 |
| 4,918,683 | 4/1990 | Kodera et al. ...................... 369/275 |
| 4,923,765 | 5/1990 | Takamaya et al. ................. 428/694 |
| 4,938,915 | 7/1990 | Saito ....................................... 369/13 |
| 5,077,714 | 12/1991 | Katamaya et al. .................... 369/13 |
| 5,089,358 | 2/1992 | Taki et al. ............................. 428/694 |
| 5,109,375 | 4/1992 | Greidanus et al. ................... 369/13 |
| 5,143,798 | 9/1992 | Fujii ..................................... 428/694 |

Primary Examiner—Jack I. Berman
Assistant Examiner—James Beyer
Attorney, Agent, or Firm—Antonelli, Terry, Stout & Kraus

[57] ABSTRACT

An optical recording/ reproducing method which is characterized by irradiating a magnetic material having a perpendicular anisotropy with a laser beam to cause a change in the perpendicular anisotropy in the magnetic material to a non-perpendicular anisotropy thereby to record information; and by reproducing the information by detecting a change in a magneto-optic effect such as the Kerr effect. Also disclosed are an optical recording material and an optical recording device for use in the optical recording/reproducing method.

10 Claims, 3 Drawing Sheets

OPTICAL RECORDING/REPRODUCING BY CHANGING PERPENDICULAR MAGNETIC ANISOTROPY TO NON-PERPENDICULAR MAGNETIC ANISOTROPY

BACKGROUND OF THE INVENTION

The present invention relates to write once type optical recording and optical recording/reproducing methods using a laser beam, and an optical recording material and an optical recording device using the methods. More particularly, the present invention relates to optical recording and optical recording/ reproducing methods useful for a high recording density, and an optical recording material and an optical recording device using the methods.

There are enhanced needs for file memories of high density and capacity in accordance with higher development of the information society. An optical recording is noted as the memories for satisfying the needs. This optical recording is divided into read only type, write once type and erasable type, which are properly used for individual applications. Here, the write once type optical disc uses a chalcogenide as its recording material and is formed with pores when irradiated with a laser beam. The recording is carried by making use of a change in reflectivity due the pores.

The present investigation of the write once type optical disc is centralized for improving the recording density. For this improvement, it is conceived to form minute recording pits by using a laser beam having a short wavelength and to use a pit edge recording together. It is, however, difficult to form pits having a satisfactory shape from the existing materials.

An improved optical recording medium is disclosed in U.S. Pat. Nos. 4,176,277 and 4,405,862. This optical recording medium has a structure, in which a thermal sensitive film and an absorption film are laminated. The absorption film absorbs the recording beam and changes it into heat, which is diffused in the thermal sensitive film for the recording operation.

The prior art thus exemplified has a limit in forming recording pits of about 1 μm, thus leaving a problem that the improvement in the recording density is limited.

SUMMARY OF THE INVENTION

A first object of the present invention is to provide a highly dense write once type optical recording method capable of forming minute recording pits.

A second object of the present invention is to provide a highly dense write once type optical recording/reproducing method capable of forming minute recording pits.

A third object of the present invention is to provide an optical recording material for use in those methods.

A fourth object of the present invention is to provide an optical recording device for such optical recording.

The above-specified first object can be achieved by the following Items:

(1) An optical recording method characterized by irradiating a magnetic material having a perpendicular anisotropy with a laser beam to cause a change in the perpendicular anisotropy in said magnetic material thereby to record information;

(2) An optical recording method according to Item 1, characterized by changing the power of said laser beam to form an optical recording material with portions to be and not to be changed in the perpendicular anisotropy;

(3) An optical recording method characterized by applying an optical energy to a desired pit of a magnetic material having a perpendicular anisotropy, to rearray of the atoms of said recording pit thereby to change said perpendicular anisotropy thereby to record information; and (4) An optical recording method according to Item 3, characterized by changing the energy of said optical energy to form an optical recording material with portions to be and not to be changed in the perpendicular anisotropy.

The above-specified second object can be achieved by the following Items:

(5) An optical recording/reproducing method characterized: by irradiating a magnetic material having a perpendicular anisotropy with a laser beam to cause a change in the perpendicular anisotropy in said magnetic material thereby to record information; and by reproducing the information by detecting such a change in a magneto-optic effect as will occur simultaneously with the first-named change;

(6) An optical recording/reproducing method according to Item 5, characterized by changing the power of said laser beam to form an optical recording material with portions to be and not to be changed in the perpendicular anisotropy;

(7) An optical recording/reproducing method according to Item 5, wherein said change in the magnetooptic effect is substantially one in the Kerr effect;

(8) An optical recording/reproducing method recording to Item 5, wherein said change in the magnetooptic effect is substantially one in the Kerr effect and the Faraday effect;

(9) An optical recording/reproducing method characterized: by applying an optical energy to a desired pit of a magnetic material having a perpendicular anisotropy, to rearray of the atoms of said recording pit thereby to change said perpendicular anisotropy thereby to record information; and by reproducing the information by detecting such a change in a magnetooptic effect as will occur simultaneously with the first-named change;

(10) An optical recording/reproducing method according to Item 9, characterized by changing the energy of said optical energy to form an optical recording material with portions to be and not to be changed in the perpendicular anisotropy;

(11) An optical recording/reproducing method according to Item 9, wherein said change in the magneto-optic effect is substantially one in the Kerr effect; and

(12) An optical recording/reproducing method according to Item 9, wherein said change in the magneto-optic effect is substantially one in the Kerr effect and the Faraday effect.

The above-specified third object can be achieved by the following Items:

(13) An optical recording material characterized by forming over a non-magnetic substrate an information recording layer, in which there are alternately laminated: a noble metal element layer having a thickness of 5 to 30 Å and made of at least one kind of element selected from the group consisting of Pd, Pt, Rh and Au; and an iron group element layer having a thickness of 2 to 15 Å and made of either at least one kind of element selected from the group consisting of Fe and Co or an alloy of at least one kind of element selected from the group consisting of Fe and Co and at least one kind of element selected from the group consisting of Pd, Pt, Rh and Au;

(14) An optical recording material according to Item 13 wherein said substrate is optically transparent;

(15) An optical recording material according to Item 13, wherein said information recording layer has a thickness ranging from 800 to 1,500 Å;

(16) An optical recording material according to Item 13, wherein said information recording layer is made to have such a thickness of 100 to 500 Å as can transmit therethrough an optical beam for reproducing the information recorded in said information recording layer, and wherein an optically reflecting layer for reflecting an optical beam is disposed at the side opposed to the side of said information recording layer, at which an optical beam comes;

(17) An optical recording material according to Item 13, wherein said optical recording member is formed with not only a write once type portion but also a read only type portion and/or an erasable type portion;

(18) An optical recording material characterized by forming over a non-magnetic substrate an information recording layer made of an alloy of at least one kind of heavy rare earth element selected from the group consisting of Tb, Gd, Dy and Ho, at least one kind of light rare earth element selected from the group consisting of Nd, Pr, Sm and Ce, and at least one kind of element selected from the group consisting of Fe and Co;

(19) An optical recording material according to Item 18, wherein said substrate is optically transparent;

(20) An optical recording material according to Item 18, wherein said information recording layer has a thickness ranging from 800 to 1,500 Å;

(21) An optical recording material according to Item 18, wherein said information recording layer is made to have such a thickness of 100 to 500 Å as can transmit therethrough an optical beam for reproducing the information recorded in said information recording layer, and wherein an optically reflecting layer for reflecting an optical beam is disposed at the side opposed to the side of said information recording layer, at which an optical beam comes; and

(22) An optical recording material according to Item 18, wherein said optical recording member is formed with not only a write once type portion but also a read only type portion and/or an erasable type portion.

The above-specified fourth object can be achieved by the following Items:

(23) An optical recording device comprising: holding means for holding an optical recording material which is prepared by laying an information recording layer made of a magnetic material having a perpendicular anisotropy over a non-magnetic and optically transparent substrate; a laser for irradiating said information recording layer to change magnetic characteristics in said information recording layer thereby to record information; and control means for controlling the optical beam emanating from said laser to a desired position of said information recording layer; and

(24) An optical recording device comprising: holding means for holding an optical recording material which is prepared by laying an information recording layer made of a magnetic material having a perpendicular anisotropy over a non-magnetic and optically transparent substrate; energy applying means for issuing an energy to rearray atoms in a desired recording pit of said information recording layer so as to change magnetic characteristics in said recording pit thereby to record information; and control means for controlling the energy issued from said energy applying means to a desired position of said information recording layer.

If, in the optical recording material as defined in the foregoing Item 13, the iron group element layer is made of an alloy of at least one kind of element selected from the group consisting of Fe and Co and at least one kind of element selected from the group consisting of Pd, Pt, Rh and Au, it is preferable to use the former element such as Fe at 70 to 99.9 at. % and the latter element such as Pd at 0.1 to 30 at. % in composition ratio.

In the optical recording material as defined in Item 18, it is preferable to use the total amount of at least one kind of heavy rare earth element selected from the group consisting of Tb, Gd, Dy and Ho and at least one kind of light rare earth element selected from the group consisting of Nd, Pr, Sm and Ce at 15 to 35 at. % and at least one kind of element selected from the group consisting of Fe and Co at 65 to 85 at % in composition ratio. It is further preferable that the amount of the heavy rare earth elements is 50 to 100 at. % in composition ratio of the total amount of it and the light rear earth elements. If the two elements Fe and Co are used together, it is further preferable to use the element Co at 30 at. % or less or at 50 at. % or more in composition ratio of those two elements. It is further preferable to add at least one of the elements Nb, Ti, Ta and Cr within a range of 2 to 5 at. % of the total with a view to improving the corrosion resistance.

In order to improve the signal output at the reproduction time, on the other hand, the information recording layer can be made to have a thickness capable of transmitting therethrough an optical beam, and an optically reflecting layer can be disposed at the side opposed to the incident side of an optical beam. As a result, both the two effects of the Kerr effect and the Faraday effect can be utilized for the detection by the multi-interference of the optical beams. In this case, the thermal conductivity of the optically reflecting layer is important for forming the minute recording pits, and it is also important to control the diffusion of heat to the surrounding through the information recording layer and the optically reflecting layer. Similar effects can be achieved no matter which the direction of direction of the beam might take place from the side of the substrate through the substrate or from the side of the recording layer not through the substrate. Thus, the temperature of the recording layer at its portions irradiated with the laser beam can be controlled to perform the recording highly reliably and form the minute recording pits. The method of the present invention is suited for the pit edge recording, too, to achieve a higher recording density.

If the information recording layer made of a magnetic material having a perpendicular anisotropy is partially irradiated with a laser beam or the like, the irradiated portion is heated to reduce its magnetic characteristics such as the perpendicular anisotropy. This layer has not only the perpendicular anisotropy but also the magnetooptic effect such as the Kerr effect. This Kerr effect disappears simultaneously with a change in the perpendicular anisotropy. As a result, information can be recorded by making use of a change in the perpendicular anisotropy due to the irradiation with the laser beam or the like, and the recorded information can be reproduced by making use of a change in the Kerr effect. If the laser beam having a short wave is focused by a lens, a minute spot can be formed, the thermal change in the magnetic characteristics is suitably caused because the temperature at the central portion of the optical spot is high.

BRIEF DESCRIPTION OF THE DRAWINGS

FIG. 7 illustrates a portion of an optical disc 21' formed with a write once portion 41, a read only portion 42, and an erasable portion 43.

DESCRIPTION OF THE PREFERRED EMBODIMENTS

The present invention will be described in detail in the following in connection with Examples 1 to 3.

EXAMPLE 1

Figure 2:
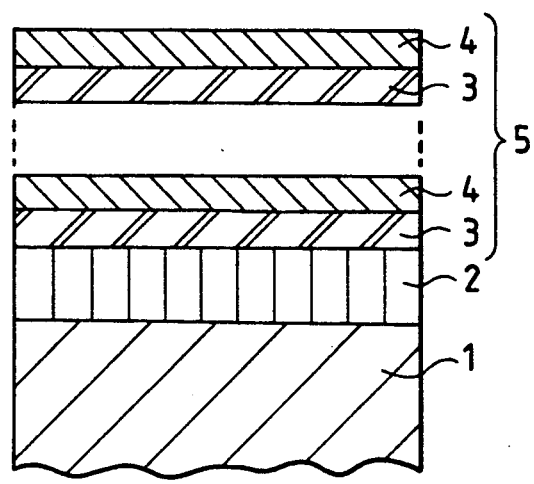
FIG. 2 is a schematic diagram showing a sectional structure of a portion of an optical disc according to one embodiment of the present invention.

A sectional structure of a portion of an optical disc formed in the present Example is schematically shown in FIG. 2. A glass substrate 1 was formed by the sputtering method with a dielectric layer 2 made of silicon nitride and having a thickness of 550 Å. This dielectric layer 2 has a refractive index $n=2.10$. Subsequently, an information recording layer 5 made of multi-layers of Pt/Co was formed. This layer 5 is formed of multi-layered films in which an iron group element layer 3 having a thickness of 10 Å and made of Co and a rare metal element layer 4 having a thickness of 19 Å and made of Pt are alternately laminated. The sputtering step was stopped when the total thickness reached 250 Å. Here, the substrate may be made of plastics or the like, as in the following.

Figure 3:
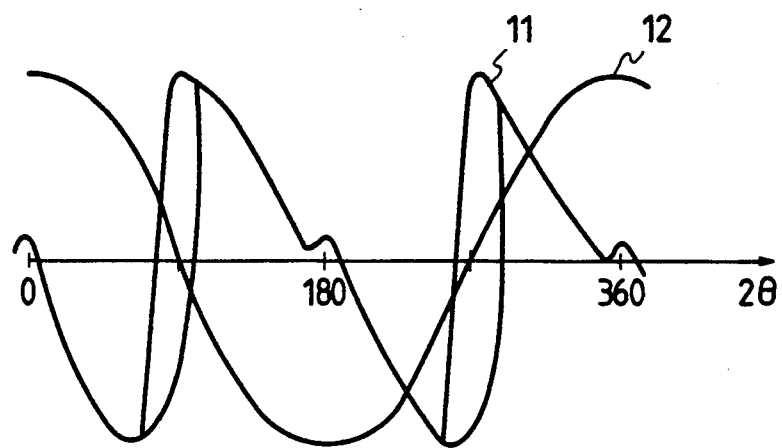
FIG. 3 is a diagram showing changes in torque curves due to a heat treatment.

Simultaneously with this optical disc, a test sample was prepared and subjected to a heat treatment in a vacuum at 400° C. for 25 minutes. The changes in the torque curves before and after the heat treatment were measured, as plotted in FIG. 3. The sample immediately after the films had been formed exhibited such a hysteresis of a typical perpendicular magnetization film as has high peaks around 90 degrees and 270 degrees. On the contrary, the sample after the heat treatment exhibited a hysteresis of a typical in-plane magnetization film having peaks around 0 degrees, 180 degrees and 360 degrees.

Figure 1:
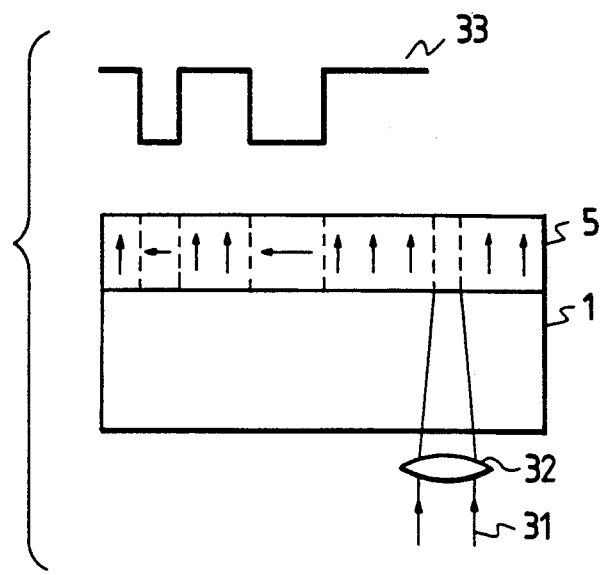
FIG. 1 is a schematic diagram showing the optical recording principle of the present invention.

The recording in the disc was tried by making use of the aforementioned changes. FIG. 1 is a schematic diagram showing this recording principle. In FIG. 1; reference numeral 33 designates a reproduced signal; numeral 31 a laser beam; numeral 32 a focusing lens; numeral 1 a substrate; and numeral 5 an information recording layer. At the recording: the rotational speed of the disc was 2,400 r.p.m.; the laser power 5 mW; the frequency 25 MHz; the wavelength of the laser beam 530 nm. The information thus recorded was reproduced. The laser power at this reproduction was 0.7 mW. For the recording pit of about 0.35 μm and the disc position of $r=30$ mm, the carrier to noise ratio C/N was 48 dB to establish a reproduced output sufficient for the code data recording. As illustrated in FIG. 1, the information recording layer 5 has a perpendicular anisotropy wherein the layer is magnetized in the vertical direction represented by the arrows extending perpendicular to the surface of the layer 5 ( ↑ ). For recording information by forming minute recording bits, the laser is focused on the layer 5 as illustrated so as to change the perpendicular anisotropy thereof to a non-perpendicular anisotropy as represented by the arrows extending in the in-plane magnetization direction or a lateral direction which is parallel to the surface of the layer 5 (←). As shown by signal 33, the lateral magnetization direction of non-perpendicular anisotropy is detected as recorded information by a magnetooptic effect indicating absence or non-presence of the perpendicular magnetization direction.

Figure 6:
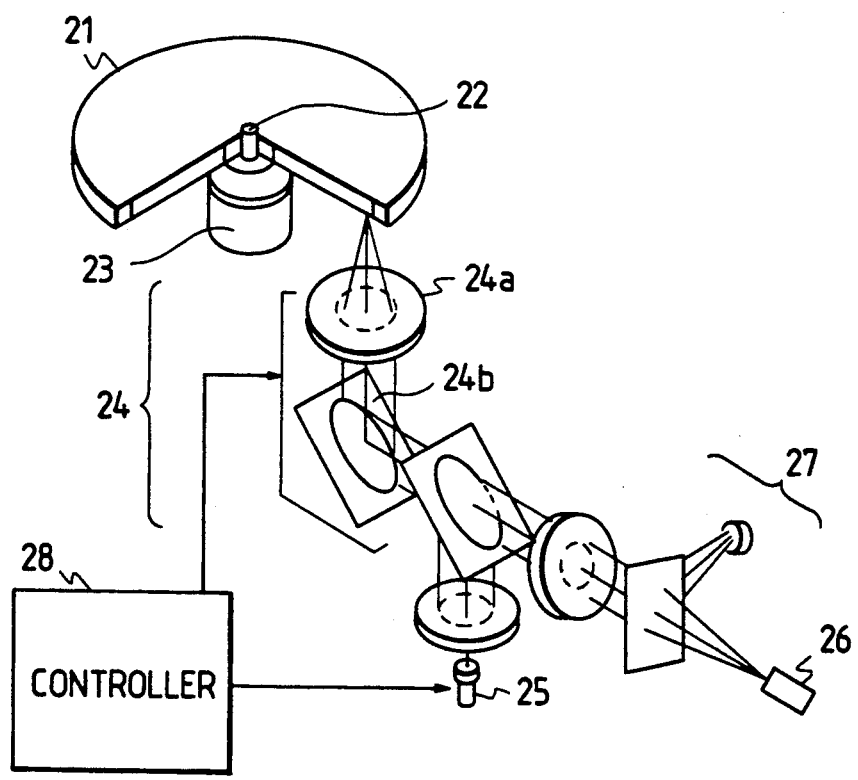
FIG. 6 is a schematic diagram showing an optical recording device according to one embodiment of the present invention.

On the other hand, FIG. 6 is a schematic diagram showing an optical recording device used in the recording operation. An optical disc 21 has a sandwich structure having an information recording layer sandwiched and is held by holding means 22 which is rotated by a motor 23. A laser beam emanating from a recording laser 25 is guided to irradiate a desired position of the optical disc 21 by a recording/ reproducing line 24 composed of a galvanomirror 24b and a lens 24a. These are controlled by control means 28. Here, reference numeral 27 designates a detecting line for detecting the recording position or the like, and numeral 26 designates a laser for the detection.

Similar effects could be attained even if the optical disc was made of not Pt but Pd, Rh or Au and not Co but Fe, an alloy of FeCo or an alloy of PdCo, PtCo, RhCo, AuCo, PtFe, PdFe, RhFe, AuFe, PtFeCo, PdFeCo, AuFeCo or RhFeCo.

Similar effects to those from Pt/Co were obtained even if another combination of those elements or alloys such as Pd/Fe, Rh/Fe, Au/Fe, Pd/FeCo, Rh/FeCo, Au/FeCo, Pd/PtCo, Rh/PtCo, Au/PtCo, Pd/Pd Co, Rh/RdCo, Au/PdCo, Pd/RhCo, Rh/RhCo, Au/RhCo, Pd/AuCo, Ru/AuCo or Au/AuCo was used or if Co was replaced by Fe in those combinations.

Moreover, the most preferable range of the film thickness ratio was 2:1 to 4:1 for the Pt/Co alloy.

EXAMPLE 2

Figure 4:
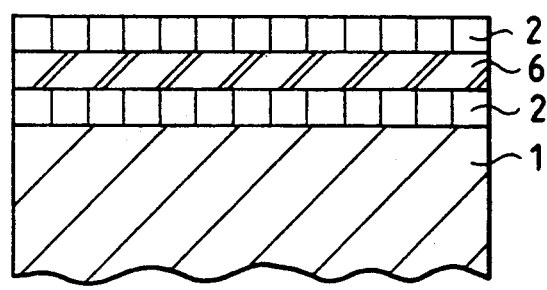
FIG. 4 is a schematic diagram showing a sectional structure of a portion of an optical disc according to another embodiment of the present invention.

A sectional structure of a portion of an optical disc formed in the present Example is schematically shown in FIG. 4. The disc was formed by sputtering over the glass substrate 1 the dielectric layer having a refractive index of $n=2.10$) made of silicon nitride and having a thickness of 550 Å. Next, an information recording layer 6 was formed of a $(Tb_{0.6}Nd_{0.4})_{25}Fe_{52}Co_{20}Nb_3$. This film was prepared by the sputtering method to give a thickness of 800 Å. Then, the silicon nitride dielectric layer 2 was formed again to have a film thickness of 1,500 Å.

The disc thus prepared was recorded at a rotational disc speed of 2,400 r.p.m., a laser power of 9 mW, a laser wavelength of 530 nm, pulse width of 40 ns and a recording frequency of 20 MHz. And, the reproduction was performed by an output of 1.2 mW. The carrier to noise ratio was C/N=48 dB for a disc position of $r=30$ mm. This fact implies that the code data recording is possible.

The disc thus prepared was formed with guide grooves for a header signal such as a clock signal or a reference signal and for positioning the information. Specifically, the recording film was irradiated with a He-Ne laser beam having a power of 15 mW to change the magnetic characteristics, i.e., the perpendicular anisotropy. The recording position of the information in the disc was controlled by detecting a difference in the magnetooptic effects (i.e., both the Kerr effect and the Faraday effect in this case) between the portion having the magnetic characteristics changed and the portion having the perpendicular anisotropy. In addition, information to be recorded in advance was recorded as the system information or the like of the personal computer. This information may be recorded for each sector or in a predetermined area such as a radially intermediate or inner portion of the disc. The utility could be improved by user's recording his own programs or various data in the disc. Moreover, the recorded information could be reproduced with no error. Thanks to the system information recorded in advance, it is possible to control the system with data exchanges and to store the data made by the user thereby to improve the utility. It is naturally possible to rewrite the information of the user area. The reproduction of the information in the user's area was performed by detecting a difference in the Kerr effect and the Faraday effect. In order to detect the magneto-optic effect, the information was reproduced by irradiating a recording medium with a linearly polarized optical beam to detect the change in the polarization characteristics of the reflected beam. A higher recording density can be obtained by shorting the gap between the guide grooves, by using a laser beam having a shorter wave, by shortening the bit pitch or by accomplishing the pit edge recording. The recording density can naturally be enhanced to a higher value by combining those methods.

The effects of the present invention are not dependent upon the structure of the optically magnetic disc, the materials of the individual layers, the starting unit or the wavelength of the laser beam. The material and structure used is merely an example so that the effects of the present invention are not influenced by the example.

Similar effects could be obtained even if the material of the information recording layer was exemplified by Dy, Ho or Gd in place of Tb as the heavy rare earth element. Similar effects could also be obtained even if the light rare earth element Nd was replaced by Pr, Sm or Ce. Moreover, Nb could be replaced by Ti, Ta or Cr, and these elements contribute to improving the corrosion resistance. On the other hand, the present Example was exemplified by containing both Fe and Co but may be modified by containing either of them although the Kerr effect is deteriorated. Moreover, the ratio between the rare earth element and the iron group element was 25:75 and was not fixed by the ratio but exhibited the perpendicular anisotropy, if within a range of 20 to 35:80 to 65, so that it could be used as the perpendicular magnetization film.

Furthermore, the recording can be achieved on the basis of a principle similar to the aforementioned one even if an alloy film used is made of at least one kind of heavy rare earth element selected from the group consisting of Tb, Dy, Ho and Gd, at least one kind of light rare earth element selected from the group consisting of Nd, Pr, Sm and Ce, and at least one kind of iron group element selected from the group consisting of Fe and Co.

EXAMPLE 3

Figure 5:
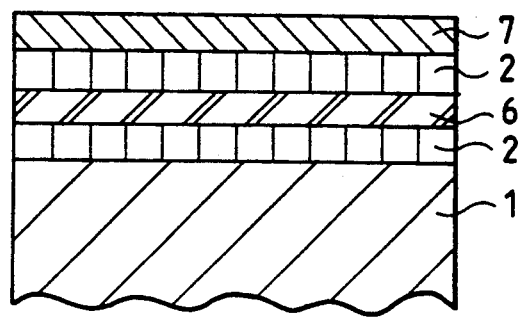
FIG. 5 is a schematic diagram showing a sectional structure of a portion of an optical disc according to still another embodiment of the present invention.

A sectional structure of a portion of an optical disc made in the present Example is schematically shown in FIG. 5. This disc was prepared at first by forming the dielectric layer 2 of silicon nitride having a film thickness of 500 Å over the glass substrate 1. Subsequently, a multi-layer of Pt/FeCo was formed to have a film thickness of 300 Å as the information recording layer 6. For this step, the two-dimensional simultaneous sputtering method was used. The dielectric layer 2 of silicon nitride was formed again to have a film thickness of 100 Å. After this, an optically reflecting layer 7 was finally formed of an $Al_{70}Ti_{30}$ alloy having a film thickness of 500 Å.

The optical disc thus prepared was recorded at a disc position of $\gamma = 30$ mm and with a laser power of 7 mW, a laser beam wavelength of 480 nm, a recording frequency of 20 MHz, pulse width of 40 ns and a rotational disc speed of 2,400 r.p.m. The recorded information was reproduced in carrier to noise ratio of $C/N = 49$ dB by a power of 1.5 mW. This implies that the code data recording is possible.

Here, similar effects could be obtained even if the multi-layer of Pt/Co was replaced as the material of the information recording layer 6 by the material exemplified in the foregoing Example 1 or 2. Moreover, the optically reflecting layer 7 was made of $Al_{70}Ti_{30}$, but what is important here is the thermal conductivity and the reflectivity. Thus, the effects are not especially dependent upon the material if that condition is satisfied. As a material for satisfying the condition, the Al may be replaced as a parent material by Pt, Pd, Rh, Ag, Cu, Au, Cr or Pb, to which an element other than the parent element is added, or the Ti may be replaced by an element Nb, Ta, W or Mo so as to adjust the thermal conductivity.

By utilizing the principle that the recording is performed by making use of a change in magnetic characteristics so that the recorded information may be detected as a change in the magnetic characteristics such as the magneto-optic effect, according to the present invention, minute recorded pits can be formed to provide write once type optical recording and optical recording/reproducing methods capable of having super-high recording density. In addition, there can be provided an optical recording to be used in the methods and an optical recording device suited for the optical recording method. The recording density can also be improved by using the pit edge recording method together.

What is claimed is:

1. An optical recording material characterized by forming over a non-magnetic substrate an information recording layer, in which there are alternately laminated: a noble metal element layer having a thickness of 5 to 30 Å and made of at least one kind of element selected from the group consisting of Pd, Pt, Rh and Au; and an iron group element layer having a thickness of 2 to 15 Å and made of either at least one kind of element selected from the group consisting of element selected from the group consisting of Fe and Co and at least one kind of element selected from the group consisting of Pd, Pt, Rh and Au, said information recording layer including at least one portion having a perpendicular anisotropy and at least parts of the one portion being changeable to a non-perpendicular anisotropy.

2. An optical recording material according to claim 1, wherein said substrate is optically transparent.

3. An optical recording material according to claim 1, wherein said information recording layer has a thickness ranging from 800 to 1,500 Å.

4. An optical recording material according to claim 1, wherein said information recording layer is made to have such a thickness of 100 to 500 Å as can transmit therethrough an optical beam for reproducing the information recorded in said information recording layer, and wherein an optically reflecting layer for reflecting an optical beam is disposed at the side opposed to the side of said information recording layer, at which an optical beam comes.

5. An optical recording material according to claim 1, wherein said optical recording member is formed with not only a write once type portion but also at least one of a read only type portion and an erasable type portion.

6. An optical recording material characterized by forming over a non-magnetic substrate an information recording layer made of an alloy of at least one kind of heavy rare earth element selected from the group consisting of Tb, Gd, Dy and Ho, at least one kind of light rare earth element selected from the group consisting of Nd, Pr, Sm and Ce, and at least one kind of element selected from the group consisting of Fe and Co, said information recording layer including at least one portion having a perpendicular anisotropy and at least parts of the one portion being changeable to a non-perpendicular anisotropy.

7. An optical recording material according to claim 6, wherein said substrate is optically transparent.

8. An optical recording material according to claim 6, wherein said information recording layer has a thickness ranging from 800 to 1,500 Å.

9. An optical recording material according to claim 6, wherein said information recording layer is made to have such a thickness of 100 to 500 Å as can transmit therethrough an optical beam for reproducing the information recorded in said information recording layer, and wherein an optically reflecting layer for reflecting an optical beam is disposed at the side opposed to the side of said information recording layer, at which an optical beam comes.

10. An optical recording material according to claim 6, wherein said optical recording member is formed with not only a write once type portion but also at least one of a read only type portion and an erasable type portion.

* * * * *